(12) United States Patent
Zeiynali Farid et al.

(10) Patent No.: US 12,371,020 B2
(45) Date of Patent: Jul. 29, 2025

(54) VEHICLE-BASED STOP-AND-GO MITIGATION SYSTEM

(71) Applicant: TOYOTA MOTOR ENGINEERING & MANUFACTURING NORTH AMERICA, INC., Plano, TX (US)

(72) Inventors: Yashar Zeiynali Farid, Mountain View, CA (US); Kentaro Oguchi, Mountain View, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 345 days.

(21) Appl. No.: 17/943,803

(22) Filed: Sep. 13, 2022

(65) Prior Publication Data
US 2024/0083432 A1 Mar. 14, 2024

(51) Int. Cl.
*G08G 1/01* (2006.01)
*B60W 30/16* (2020.01)
*B60W 30/18* (2012.01)

(52) U.S. Cl.
CPC ...... *B60W 30/18018* (2013.01); *B60W 30/16* (2013.01); *B60W 2520/10* (2013.01); *B60W 2554/4042* (2020.02); *B60W 2554/802* (2020.02); *B60W 2720/10* (2013.01)

(58) Field of Classification Search
CPC ........... B60W 30/16; B60W 30/18018; B60W 2520/10; B60W 2554/4042; B60W 2554/802; B60W 2720/10
See application file for complete search history.

(56) References Cited

U.S. PATENT DOCUMENTS

| | | | |
|---|---|---|---|
| 5,283,575 A | 2/1994 | Kao | |
| 6,862,524 B1 | 3/2005 | Nagda | |
| 6,867,733 B2 | 3/2005 | Sandhu | |
| 11,042,163 B2 | 6/2021 | Chen | |
| 11,493,926 B2 | 11/2022 | He | |
| 11,814,079 B2 | 11/2023 | Dagan | |
| 12,091,025 B2 * | 9/2024 | Kwon | ...................... G06N 3/08 |
| 2016/0055744 A1 | 2/2016 | Branson | |
| 2020/0242922 A1 | 7/2020 | Dulberg | |
| 2021/0201669 A1 | 7/2021 | Mitra | |
| 2022/0388505 A1 * | 12/2022 | Sharma Banjade | ........................ G08G 1/096783 |

(Continued)

OTHER PUBLICATIONS

USDOT, "Freight Performance Measure Approaches for Bottlenecks, Arterials, and Linking Volumes to Congestion Report," Aug. 2015, 104 pages (https://rosap.ntl.bts.gov/view/dot/41268/dot_41268_DS1.pdf).

(Continued)

*Primary Examiner* — Dalena Tran
(74) *Attorney, Agent, or Firm* — SHEPPARD, MULLIN, RICHTER & HAMPTON LLP; Daniel N. Yannuzzi

(57) ABSTRACT

Systems and methods are provided for activating mitigation strategies to reduce or eliminate the stop-and-go traffic. Mitigation strategies can be applied to reduce stop-and-go traffic or prevent a control vehicle from experiencing stop-and-go traffic. The control vehicle can predict when to apply mitigation strategies based on sensor data that can be applied to generate a trajectory for the control vehicle or a preceding vehicle.

20 Claims, 7 Drawing Sheets

(56) References Cited

U.S. PATENT DOCUMENTS

| | | | |
|---|---|---|---|
| 2023/0058169 A1* | 2/2023 | Cella | G06N 3/042 |
| 2023/0150502 A1* | 5/2023 | Dickson | B60W 50/14 |
| | | | 701/95 |
| 2023/0316920 A1* | 10/2023 | Di Cairano | B60W 30/09 |
| | | | 701/26 |

OTHER PUBLICATIONS

Čičić et al., "Platoon-Actuated Variable Area Mainstream Traffic Control for Bottleneck Decongestion," European Journal of Control, Elsevier, Jun. 14, 2022, 8 pages (https://doi.org/10.1016/j.ejcon.2022.100687).

Čičić et al., "Coordinating Vehicle Platoons for Highway Bottleneck Decongestion and Throughput Improvement," IEEE Transactions on Intelligent Transportation Systems, 23(7):8959-8971, Jun. 24, 2021, 13 pages (https://doi.org/10.1109/TITS.2021.3088775).

Ibrahim et al., "Control of Platooned Vehicles in Presence of Traffic Shock Waves," 2019 IEEE Intelligent Transportation Systems Conference (ITSC), Oct. 29, 2019, 8 pages (http://www.es.ele.tue.nl/~tbasten/papers/ITSC19_Control_of_Platooned_Vehicles_in_Presence_of_Traffic_Shock_Waves_final.pdf).

Zheng et al., "Freeway Traffic Oscillations: Microscopic Analysis of Formations and Propagations using Wavelet Transform," 19th International Symposium on Transportation and Traffic Theory, 17(2011):717-731 (https://doi.org/10.1016/j.sbspro.2011.04.540).

Sugiyama et al., "Traffic Jams without Bottlenecks—Experimental Evidence for the Physical Mechanism of the Formation of a Jam," New Journal of Physics, 10(2008):033001, Mar. 4, 2008, 8 pages (https://iopscience.iop.org/article/10.1088/1367-2630/10/3/033001).

Beaty, "Traffic 'Experiments' and a Cure for Waves & Jams," 1998 (http://www.amasci.com/amateur/traffic/trafexp.html).

Cui et al., "Stabilizing Traffic Flow via a Single Autonomous Vehicle: Possibilities and Limitations," 2017 IEEE Intelligent Vehicles Symposium (IV), Jun. 13, 2017, pp. 1336-1341 (https://lab-work.github.io/download/Cui2017.pdf).

Li et al., "Stop-and-Go Traffic Analysis: Theoretical Properties, Environmental Impacts and Oscillation Mitigation," Transportation Research Part B, 70(2014):319-339 (https://doi.org/10.1016/j.trb.2014.09.014).

Stern et al., "Dissipation of Stop-And-Go Waves via Control of Autonomous Vehicles: Field Experiments," Transportation Research, Part C, Emerging Technologies, 89(C):205-221, Apr. 2018 (https://doi.org/10.1016/j.trc.2018.02.005).

Wu et al., "Stabilizing Traffic with Autonomous Vehicles," 2018 IEEE International Conference on Robotics and Automation (ICRA), May 2018, pp. 6012-6018 (https://uclalemur.com/publications/wu2018icra.pdf).

Goulet et al., "Impacts of Distributed Speed Harmonization and Optimal Maneuver Planning on Multi-Lane Roads," 2020 IEEE Conference on Control Technology and Applications (CCTA), Aug. 2020, pp. 305-311 (https://www.osti.gov/servlets/purl/1863340).

Suriyarachchi et al., "Shock Wave Mitigation in Multi-Lane Highways Using Vehicle-to-Vehicle Communication," 2021 IEEE 94th Vehicular Technology Conference (VTC2021-Fall), 7 pages (https://nileshsuri.github.io/files/conferences/2021/shockwave_VTC_2021_Nilesh.pdf).

Xie et al., "Cooperative Driving Strategies of Connected Vehicles for Stabilizing Traffic Flow," Transportmetrica B: Transport Dynamics, 8(1):166-181 (https://doi.org/10.1080/21680566.2020.1728590).

Di Vaio et al., "Cooperative Shock Waves Mitigation in Mixed Traffic Flow Environment," IEEE Transactions on Intelligent Transportation Systems, 20(12):4339-4353, Dec. 2019 (https://doi.org/10.1109/TITS.2018.2883485).

Hale et al., "Introduction of Cooperative Vehicle-to-Infrastructure Systems to Improve Speed Harmonization," USDOT, Federal Highway Administration, Mar. 2016, 54 pages (https://www.fhwa.dot.gov/publications/research/operations/16023/16023.pdf).

Kates et al., "Flow Stabilization and Enhanced Traffic Performance using Inter-Vehicle Communication and Distributed Intelligence," 13th World Congress and Exhibition on Intelligent Transport Systems and Services, Oct. 2006 (https://www.researchgate.net/publication/228574217_Flow_stabilization_and_enhanced_traffic_performance_using_inter-vehicle_communication_and_distributed_intelligence).

Learn et al., "Freeway Speedharmonization Experiment Using Connected and Automated Vehicles," IET Intelligent Transport Systems, Jan. 22, 2018, 12(5):319-326 (https://doi.org/10.1049/iet-its.2017.0149).

Farid et al., "Systems and Methods for Mitigating Lane-Change Disturbance Based on Cooperative Maneuvering," pending U.S. Appl. No. 17/830,776.

Farid et al., "Systems and Methods for Planning Lane-Change Actions Considering Traffic Stability in Target Lane," U.S. Appl. No. 17/842,065.

Malikopoulos et al., "Optimal Control for Speed Harmonization of Automated Vehicles," IEEE Transactions on Intelligent Transportation Systems, 20(7):2405-2417, Sep. 13, 2018 (https://ieeexplore.ieee.org/ielaam/6979/8746731/8464283-aam.pdf).

Li et al., "Cooperative Perception for Estimating and Predicting Microscopic Traffic States to Manage Connected and Automated Traffic," IEEE Transactions on Intelligent Transportation Systems, 23(8):13694-13707, Nov. 30, 2021 (https://doi.org/10.1109/TITS.2021.3126621).

Yuan et al., "Real-Time Lagrangian Traffic State Estimator for Freeways," IEEE Transactions on Intelligent Transportation Systems, 13(1)59-70, Jan. 9, 2012 (https://doi.org/10.1109/TITS.2011.2178837).

Čičić et al., "Modelling and Lagrangian Control of Mixed Traffic: Platoon Coordination, Congestion Dissipation and State Reconstruction," Doctoral Thesis in Electrical Engineering, KTH Royal Institute of Technology, Stockholm, Sweden, 2021 (https://www.diva-portal.org/smash/get/diva2:1528074/FULLTEXT01.pdf).

Kreidieh et al., "Dissipating Stop-and-Go Waves in Closed and Open Networks via Deep Reinforcement Learning," 2018 21st International Conference on Intelligent Transportation Systems (ITSC), Nov. 2018, pp. 1475-1480 (https://bayen.berkeley.edu/sites/default/files/08569485.pdf).

Guo et al., "Merging and Diverging Impact on Mixed Traffic of Regular and Autonomous Vehicles," IEEE Transactions on Intelligent Transportation Systems, 22(3):1639-1649, Apr. 29, 2020 (https://doi.org/10.1109/TITS.2020.2974291).

Wu et al., "Flow: A Modular Learning Framework for Mixed Autonomy Traffic," IEEE Transactions on Robotics, 38 (2):1270-1286, Jul. 16, 2021 (https://doi.org/10.1109/TRO.2021.3087314).

Wu et al., "Flow: Architecture and Benchmarking for Reinforcement Learning in Traffic Control," arXiv:1710.05465v1 [cs.AI], Oct. 16, 2017 (https://flow-project.github.io/papers/1710.05465.pdf).

Zhu et al., "Merging Control Strategies of Connected and Autonomous Vehicles at Freeway On-Ramps: A Comprehensive Review," Journal of Intelligent and Connected Vehicles, 5(2):99-111, Apr. 11, 2022 (https://www.emerald.com/insight/content/doi/10.1108/JICV-02-2022-0005/full/pdf?titlie=merging-control-strategies-of-connected-and-autonomous-vehicles-atfreeway-on-ramps-a-comprehensive-review).

Ni et al., "Multivehicle Cooperative Lane Change Control Strategy for Intelligent Connected Vehicle," Journal of Advanced Transportation, 2020:8672928, pp. 1-10, Feb. 28, 2020 (https://doi.org/10.1155/2020/8672928).

Qu et al., "Jointly Dampening Traffic Oscillations and Improving Energy Consumption with Electric, Connected and Automated Vehicles: A Reinforcement Learning Based Approach," Applied Energy, 257(2020):114030, Jan. 1, 2020, 10 pages (https://doi.org/10.1016/j.apenergy.2019.114030).

Gunter et al., "Model-Based String Stability of Adaptive Cruise Control Systems Using Field Data," IEEE Transactions on Intelligent Vehicles, 5(1):90-99, Nov. 22, 2019 (https://doi.org/10.1109/TIV.2019.2955368).

* cited by examiner

VEHICLE-BASED STOP-AND-GO MITIGATION SYSTEM

CROSS REFERENCE TO RELATED APPLICATIONS

This application is co-pending with U.S. patent application Ser. No. 17/943,665 and U.S. patent application Ser. No. 17/943,917, both of which were filed concurrently with the present application. Each of these applications are hereby incorporated herein by reference in their entirety.

TECHNICAL FIELD

The present disclosure relates generally to mitigating stop-and-go traffic, and in particular, some implementations may relate to determining stop-and-go waves and activating mitigating strategies based on the waves.

DESCRIPTION OF RELATED ART

Stop-and-go traffic refers to the phenomenon where vehicles in traffic experience periods of deceleration. Stop-and-go traffic can occur for various reasons, including metered lights, lane changes, accidents, or other obstacles encountered during traffic. Mitigation strategies can be applied to reduce stop-and-go traffic or prevent such a traffic situation from occurring. However, it can be difficult for drivers to apply these strategies because the driver might not be able to perceive a stop-and-go situation until the vehicle is forced to slow down. Better methods are needed to improve automated vehicle operation and transit strategies overall.

BRIEF SUMMARY OF THE DISCLOSURE

According to various embodiments of the disclosed technology, a method can comprise receiving data from a plurality of sensors of a control vehicle and determining a trajectory; determining a first stop-and-go wave based on the trajectory and determining a time threshold for the first stop-and-go wave; based on the first stop-and-go wave and the time threshold, determining that the control vehicle is entering a deceleration phase of a second stop-and-go wave; activating a mitigation strategy within the control vehicle; and operating the control vehicle in accordance with the mitigation strategy.

In some embodiments, the method further comprises determining a reference speed for operating the control vehicle.

In some embodiments, determining a reference speed for operating the control vehicle comprises setting the reference speed at an initial speed and updating the reference speed after a stop-and-go wave.

In some embodiments, the reference speed is based on the first stop-and-go wave and time threshold.

In some embodiments, the method further comprises determining that the control vehicle is entering a cruise phase; measuring the time at which the control vehicle travels in the cruise phase; and deactivating the mitigation strategy after a cruise time threshold or a cruise distance threshold.

In some embodiments, the cruise time threshold or the cruise distance threshold is based on a maximum cruise time period or a maximum wavelength.

According to various embodiments of the disclosed technology, a vehicle can comprise at least one gap detection sensor; a processor; and a memory coupled to the processor to store instructions, which when executed by the processor, cause the processor to receive data from the at least one gap detection sensor to track a preceding vehicle's position over time and determine a trajectory; determine a first stop-and-go wave based on the trajectory and determine a time threshold for the first stop-and-go wave; based on the first stop-and-go wave and time threshold, determine that the preceding vehicle is entering a deceleration phase of a second stop-and-go wave; determine a threshold distance between the vehicle and the preceding vehicle at which to activate a mitigation strategy; activate the mitigation strategy when a distance between the vehicle and the preceding vehicle is equal to or less than the threshold distance; and operate the vehicle in accordance with the mitigation strategy.

In some embodiments, the instructions further cause the processor to determine a reference speed for operating the vehicle.

In some embodiments, the instructions further cause the processor to set the reference speed at an initial speed and update the reference speed after a stop-and-go wave.

In some embodiments, the reference speed is based on the first stop-and-go wave and time threshold.

In some embodiments, the threshold distance is determined by the reference speed, the time threshold, and a minimum desired gap with the preceding vehicle.

In some embodiments, the minimum desired gap is determined by the reference speed, a minimum gap between vehicles during stopped traffic, and a minimum time gap with the preceding vehicle.

In some embodiments, the instructions further cause the processor to: determine that the preceding vehicle is entering a cruise phase; measure the time at which the preceding vehicle travels in the cruise phase; and deactivate the mitigation strategy after a cruise time threshold or a cruise distance threshold.

In some embodiments, the cruise time threshold or the cruise distance threshold is based on a maximum cruise time period or a maximum wavelength.

According to various embodiments of the disclosed technology, a non-transitory machine-readable medium can have instructions stored therein, which when executed by a processor, cause the processor to perform operations, the operations comprising: receiving data from a plurality of sensors to track a control vehicle's position over time and determining a trajectory; determining a first stop-and-go wave based on the trajectory and determining a time threshold for the first stop-and-go wave; based on the first stop-and-go wave and time threshold, determining that the control vehicle is entering a deceleration phase of a second stop-and-go wave; activating a mitigation strategy within the control vehicle; operating the control vehicle in accordance with the mitigation strategy; determining that the control vehicle is entering a cruise phase; measuring the time at which the control vehicle travels in the cruise phase; and deactivating the mitigation strategy after a cruise time threshold or a cruise position threshold.

In some embodiments, the operations further comprise determining a reference speed for operating the control vehicle.

In some embodiments, determining a reference speed for operating the control vehicle comprises setting the reference speed at an initial speed and updating the reference speed after a stop-and-go wave.

In some embodiments, the reference speed is based on the first stop-and-go wave and time threshold.

In some embodiments, the cruise time threshold or the cruise distance threshold is based on a maximum cruise time period or a maximum wavelength.

In some embodiments, the first stop-and-go wave comprises a deceleration phase, a stopped vehicle phase, an acceleration phase, and a cruise phase.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
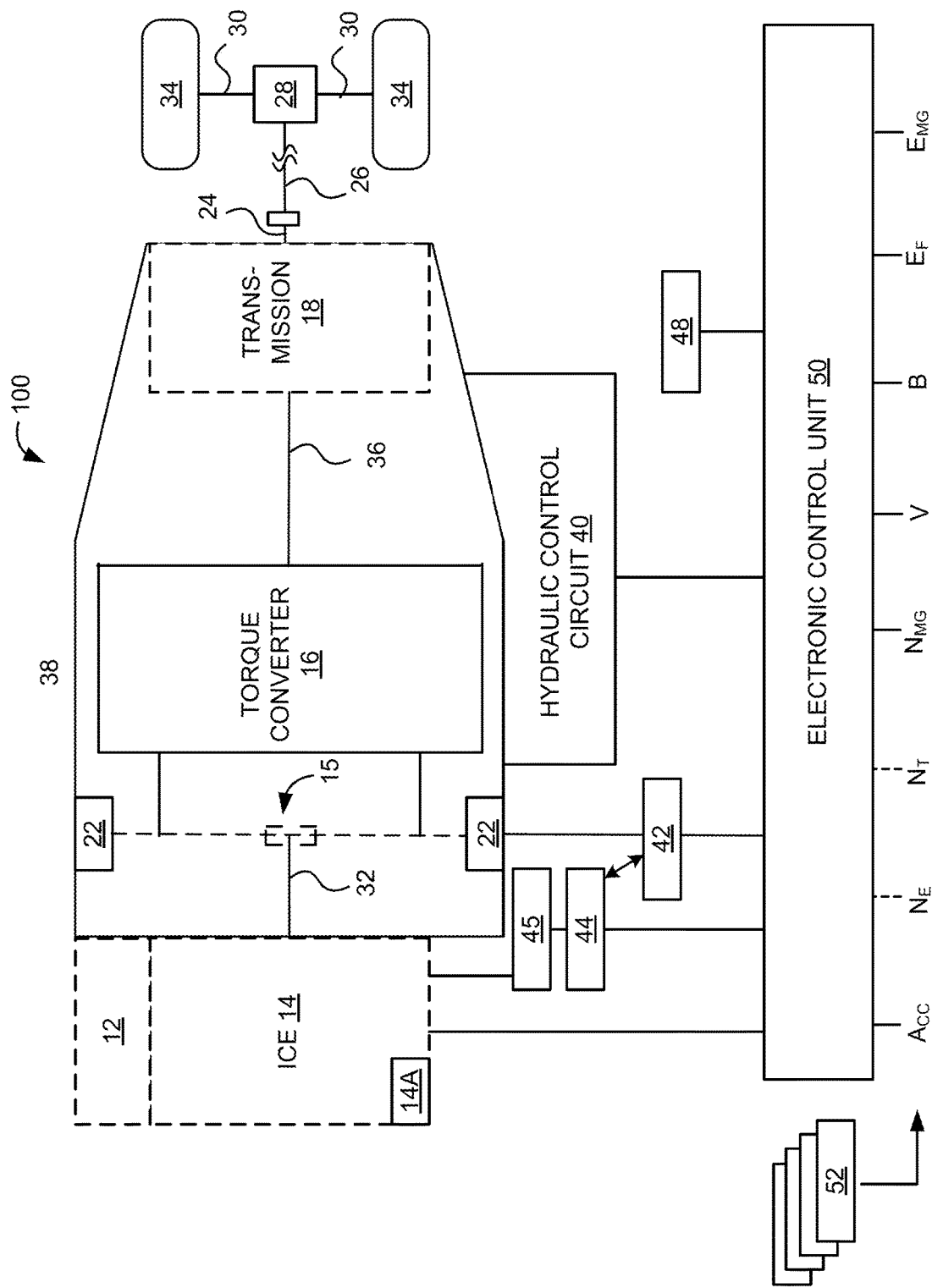
FIG. 1 is a schematic representation of an example hybrid vehicle with which embodiments of the systems and methods disclosed herein may be implemented.

The figures are not exhaustive and do not limit the present disclosure to the precise form disclosed.

DETAILED DESCRIPTION

As described above, stop-and-go traffic can occur for various reasons, including metered lights, lane changes, accidents, or other obstacles encountered during traffic. Embodiments of the systems and methods disclosed herein can provide mitigation strategies to reduce or eliminate the stop-and-go traffic. Mitigation strategies can be applied to reduce stop-and-go traffic or prevent such a traffic situation from occurring. For example, a control vehicle can predict when to apply mitigation strategies based on sensor data, meaning that the vehicle would not need access to a cloud or external database to receive, analyze, or apply appropriate data.

As used herein, "stop-and-go wave" can refer to an event where a vehicle is caused to slow down and stop due to a traffic element, and then accelerates back to a cruising speed after a time period. A "phase" can refer to a partition of a stop-and-go wave characterized by a particular trend in the vehicle's velocity (deceleration, acceleration, etc.). A vehicle's "trajectory" can refer to a vehicle's position over time, including its predicted position at a future time. A "control zone" can refer to a bounded area where a vehicle can apply mitigation strategies to reduce or eliminate stop-and-go waves. A "deceleration profile" can refer to a vehicle's predicted deceleration due to a stop-and-go wave. A "wavelength" of a stop-and-go wave can refer to the distance where a vehicle decelerates due to traffic, stops, accelerates to a cruising speed, and then is forced to decelerate again.

Stop-and-go waves can be determined based on a trajectory. A stop-and-go wave can refer to the time period where a vehicle decelerates due to traffic, stops, accelerates to a cruising speed, and then is forced to decelerate again. Each component of a stop-and-go wave can have a wavelength and a period. Vehicle systems can use these stop-and-go wavelengths to apply mitigation strategies earlier. For example, a stop-and-go wave can comprise a deceleration phase, a stopping phase, an acceleration phase, and a cruising phase. The wavelength of a stop-and-go wave can be considered as the sum of the wavelengths of all its phases, and the period of a stop-and go wave can be considered as the sum of the periods of all its phases. The wavelength of a stop-and-go wave can be considered as a distance threshold that dictates the length of the wave and the period of a stop-and-go wave can be considered as a time threshold that dictates the time of the wave. These time and distance thresholds may be constant between waves, or may vary based on real-time traffic situations. The control vehicle can determine that it is about to enter or may be currently entering a deceleration phase, meaning that the control vehicle would need to experience a stop-and-go wave.

The vehicle can determine its trajectory based on various factors, including the sensor data internally determined by the vehicle or based on effects from the trajectory of the preceding vehicle.

When determining the trajectory based on sensor data internal to the subject vehicle, the vehicle tracks its position through time using position information obtained from systems such as Global Positioning System (GPS). When determining the trajectory based on the preceding vehicle, the subject vehicle may be equipped with one or more sensors, including for example, gap detection sensors to determine the distance between vehicles in front of the control vehicle. For example, the control vehicle can determine that the preceding vehicle is entering a deceleration phase by tracking the preceding vehicle's position through time utilizing gap detection sensor's data along with the control vehicle's position information obtained from systems such as GPS.

When the trajectory is determined based on the preceding vehicle, rather than the sensor data, the control vehicle would not need to experience a stop-and-go wave. When a deceleration phase is determined, the control vehicle can activate a mitigation strategy and operate the vehicle in accordance with the mitigation strategy. The mitigation strategy may comprise maintaining the vehicle at a reference speed (e.g., through automated driving, directions to a driver, or hybrid automated driving system) in order to avoid future stop-and-go waves.

The systems and methods disclosed herein may be implemented with any of a number of different vehicles and vehicle types. For example, the systems and methods disclosed herein may be used with automobiles, trucks, motorcycles, recreational vehicles and other like on-or off-road vehicles. In addition, the principles disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for activating mitigation strategies can be implemented in other types of vehicles including gasoline- or diesel-powered vehicles, fuel-cell vehicles, electric vehicles, or other vehicles.

FIG. 1 illustrates a drive system of a vehicle 100 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 100 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 100 relies on the motive force generated at least by internal combustion engine 14, and a clutch 15 may be included to engage engine 14. In the EV travel mode, vehicle 100 is powered by the motive force generated by motor(s) 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 100 and is powered electrically via a battery 44. Battery 44 may be implemented as one or more batteries or other power storage devices including, for example, lead-acid batteries, nickel-metal hydride batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch 15 can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 100 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 100. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 100 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, gap detection, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
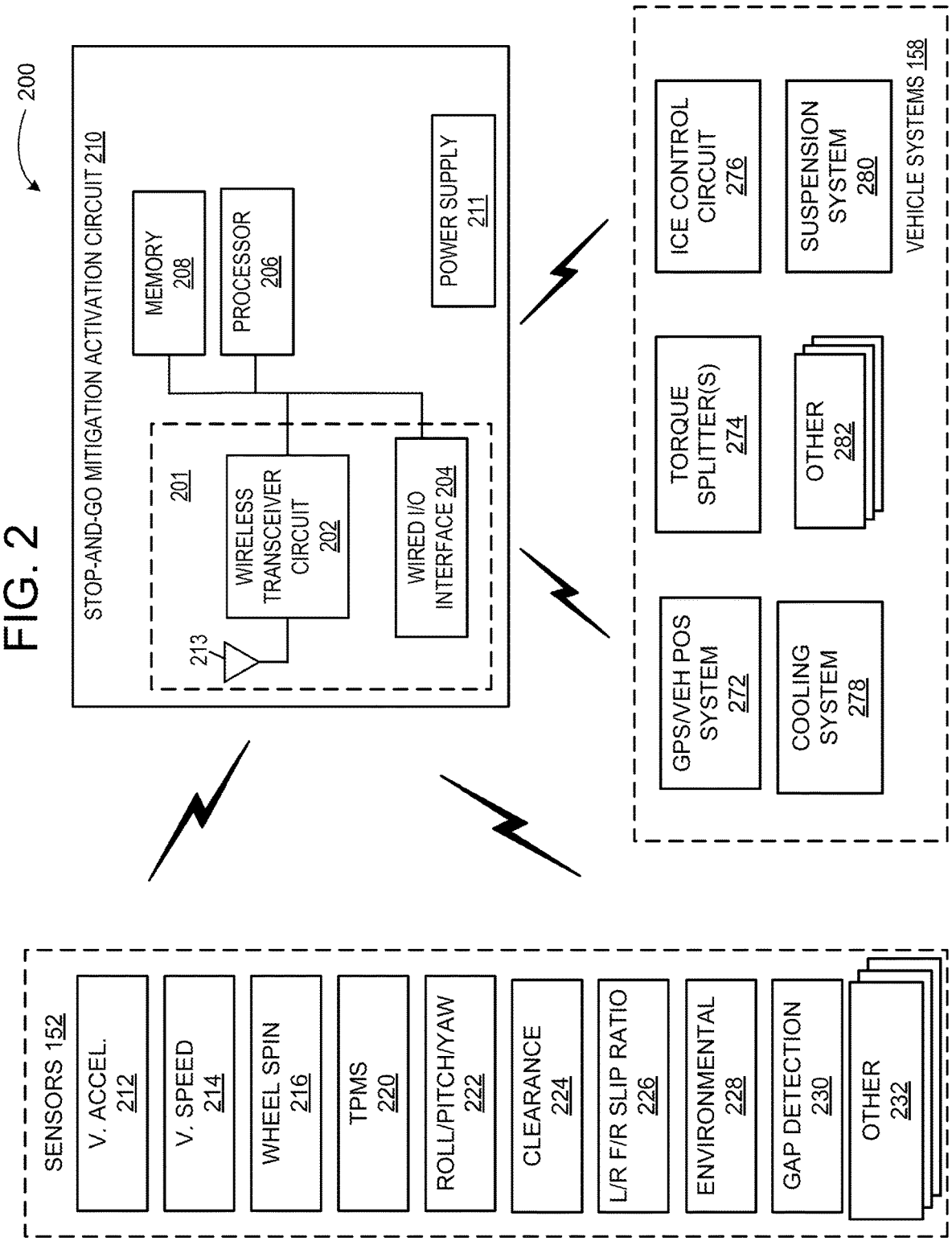
FIG. 2 illustrates an example vehicle system for activating mitigation strategies in accordance with some embodiments disclosed herein.

FIG. 2 illustrates an example vehicle system for activating mitigation strategies in accordance with one embodiment of the systems and methods described herein. In this example, system 200 includes a stop-and-go mitigation activation circuit 210, a plurality of sensors 152 and a plurality of vehicle systems 158. Sensors 152 and vehicle systems 158 can communicate with stop-and-go mitigation activation circuit 210 via a wired or wireless communication interface. Although sensors 152 and vehicle systems 158 are depicted as communicating with stop-and-go mitigation activation circuit 210, they can also communicate with each other as well as with other vehicle systems. Stop-and-go mitigation activation circuit 210 can be implemented as an ECU or as part of an ECU such as, for example electronic control unit 50. In other embodiments, stop-and-go mitigation activation circuit 210 can be implemented independently of the ECU.

Stop-and-go mitigation activation circuit 210 includes a communication circuit 201, a processor 206, a memory 208, and a power supply 211. Components of stop-and-go mitigation activation circuit 210 are illustrated as communicating with each other via a data bus, although other communication in interfaces can be included.

Processor 206 can include one or more GPUs, CPUs, microprocessors, or any other suitable processing system. Processor 206 may include a single core or multicore processors. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208 can be made up of one or more modules of one or more different types of memory, and may be configured to store data and other information as well as operational instructions that may be used by the processor 206 to initiate stop-and-go mitigation activation circuit 210.

Although the example of FIG. 2 is illustrated using processor 206 and memory 208, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a stop-and-go mitigation activation circuit 210.

Communication circuit 201 either or both a wireless transceiver circuit 202 with an associated antenna 213 and a wired I/O interface 204 with an associated hardwired data port (not illustrated). As this example illustrates, communications with stop-and-go mitigation activation circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 213 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by stop-and-go mitigation activation circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 211 can include one or more of a battery or batteries (such as, e.g., Li-ion, Li-Polymer, NiMH, NiCd, NiZn, and NiH$_2$, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 152 can include additional sensors that may or may not otherwise be included on a standard vehicle (e.g. vehicle 100) with which the system 200 is implemented. In the illustrated example, sensors 152 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, environmental sensors 228 (e.g., to detect salinity or other environmental conditions), and gap detection sensors 230 (e.g. to detect vehicles in front, behind, or to the side of the control vehicle). Additional sensors 232 can also be included as may be appropriate for a given implementation of system 200.

Vehicle systems 158 can include any of a number of different vehicle components or subsystems used to control or monitor various aspects of the vehicle and its performance. In this example, the vehicle systems 158 include a GPS or other vehicle positioning system 272; torque splitters 274 that can control distribution of power among the vehicle wheels such as, for example, by controlling front/rear and left/right torque split; engine control circuits 276 to control the operation of engine (e.g. Internal combustion engine 14); cooling systems 278 to provide cooling for the motors, power electronics, the engine, or other vehicle systems; suspension system 280 such as, for example, an adjustable-height air suspension system, or an adjustable-damping suspension system; and other vehicle systems 282.

During operation, stop-and-go mitigation activation circuit 210 can receive information from various vehicle sensors to determine whether mitigation strategies should be activated. For example, the circuit can receive vehicle's position information from sensors such as GPS and track the vehicle's own position through time and create a trajectory data. In another example, the circuit can utilize information from a gap detection sensor along with the vehicle's position sensor to track the preceding vehicle's position through time and create the preceding vehicle's trajectory data.

Communication circuit 201 can be used to transmit and receive information between stop-and-go mitigation activation circuit 210 and sensors 152, and stop-and-go mitigation activation circuit 210 and vehicle systems 158. Also, sensors 152 may communicate with vehicle systems 158 directly or indirectly (e.g., via communication circuit 201 or otherwise).

In various embodiments, communication circuit 201 can be configured to receive data and other information from sensors 152 that is used in determining whether to activate mitigation strategies. This information can comprise data to generate a control vehicle or preceding vehicle's trajectory as described above. The control vehicle can determine that stop-and-go waves are occurring based on this trajectory data and can implement mitigation strategies accordingly. Additionally, communication circuit 201 can be used to send an activation signal or other activation information to various vehicle systems 158 as part of entering the mitigation mode. For example, as described in more detail below, communication circuit 201 can be used to send signals to one or more of: torque splitters 274 to control front/rear torque split and left/right torque split; motor controllers 276 to, for example, control motor torque, motor speed of the various motors in the system; ICE control circuit 276 to, for example, control power to engine 14 (e.g., to shut down the engine so all power goes to the rear motors, to ensure the engine is running to charge the batteries or allow more power to flow to the motors); cooling system (e.g., 278 to increase cooling system flow for one or more motors and their associated electronics); suspension system 280 (e.g., to increase ground clearance such as by increasing the ride height using the air suspension). The decision regarding what action to take via these various vehicle systems 158 can be made based on the information detected by sensors 152. Examples of this are described in more detail below.

Figure 3:
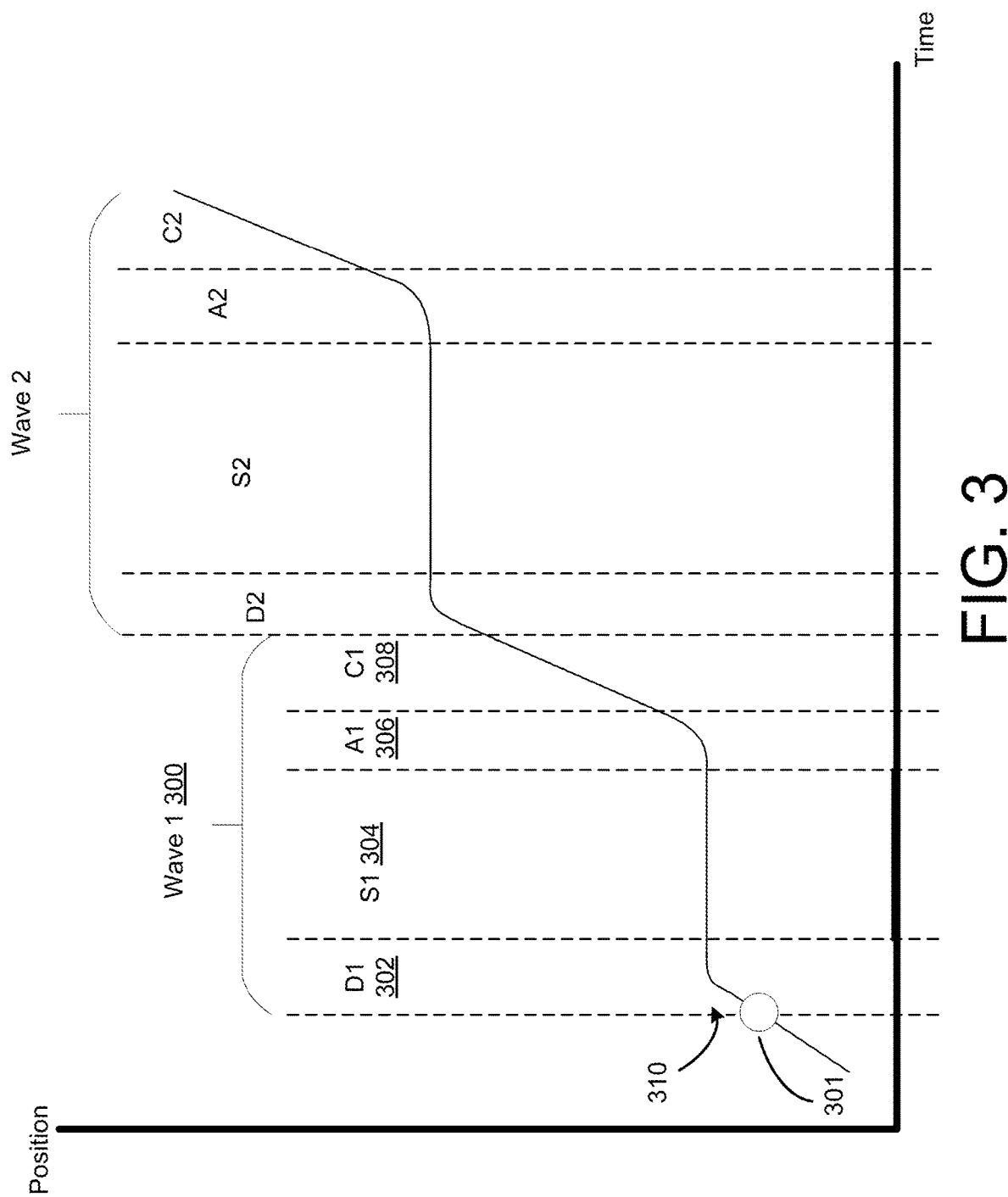
FIG. 3 illustrates an example measurement of stop-and-go waves in accordance with some embodiments disclosed herein.

FIG. 3 illustrates two example stop-and-go waves in accordance with one embodiment of the systems and methods described herein. In this example, a graph can display the control vehicle's position over time as trajectory 310. The control vehicle can track its position over time using various sensor data, including vehicle acceleration sensors 212 and vehicle speed sensors 214 illustrated in FIG. 2. In a stop-and-go traffic situation, the vehicle can generate a wave associated with vehicle's path or trajectory by receiving sensor data and graphing the position of the control vehicle over time as illustrated in FIG. 3, which in turn can be divided into stop-and-go waves. In this example, the velocity of the vehicle may correspond with the slope of the trajectory curve in the chart.

Wave 300 can begin with deceleration phase D1 302, which corresponds with the vehicle decelerating from its initial speed starting at point 301, i.e. when the slope, or velocity of the trajectory, decreases towards 0 (e.g., prior to reaching zero). Once the vehicle stops, it enters the stopping phase as illustrated in phase S1 304. During phase S1 304, the slope of the trajectory is 0. The vehicle can then enter acceleration phase A1 306, where the vehicle begins to speed up again. During phase A1 306, the slope gradually increases. Once the vehicle's speed is constant, the slope is constant, suggesting that the vehicle has entered cruising phase C1 308. Wave 300 concludes when cruising phase C1 308 ends, meaning that the vehicle begins decelerating again. At this point, a next stop-and-go wave can occur.

Figure 4:
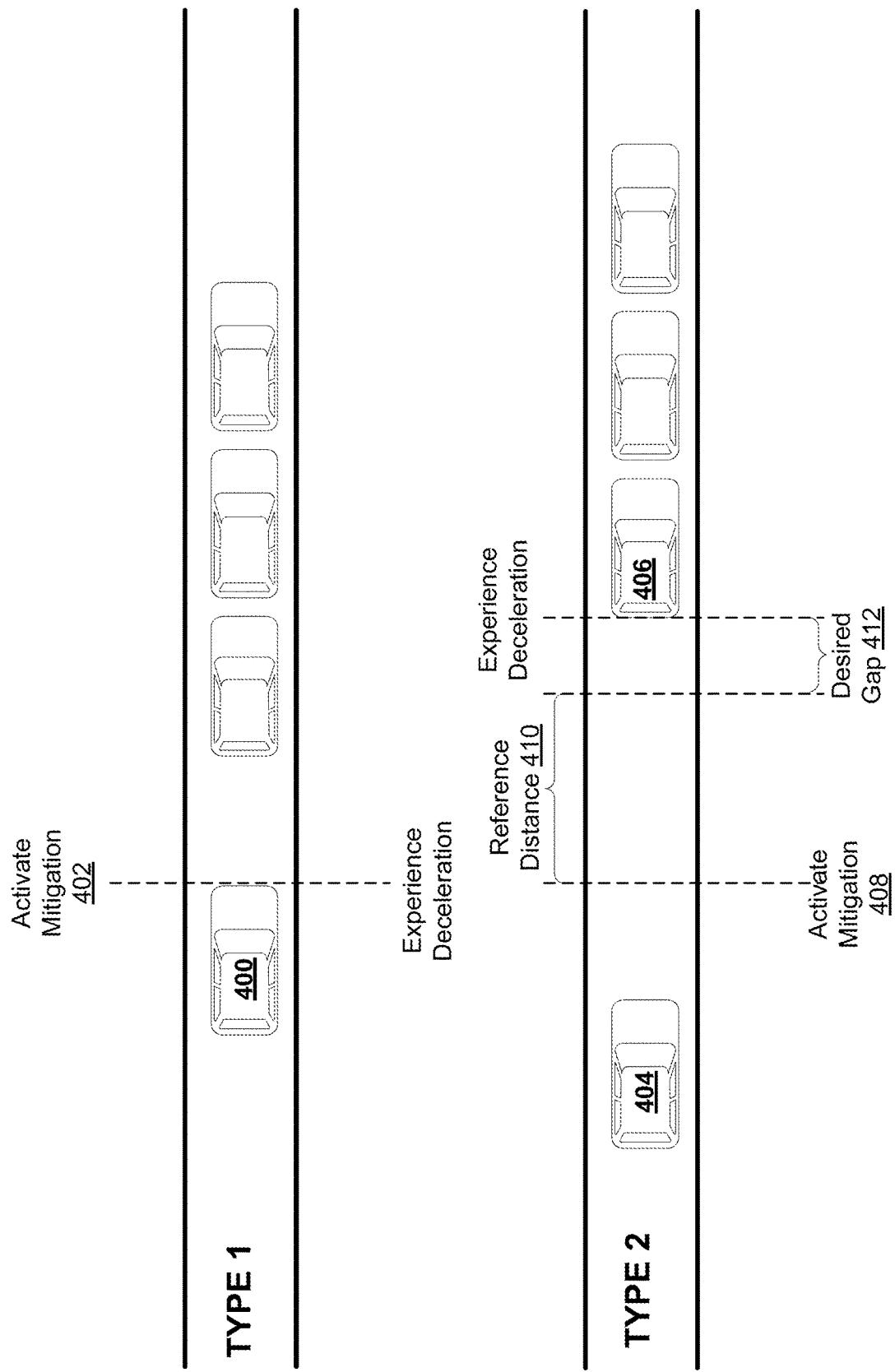
FIG. 4 illustrates two example procedures for activating mitigation strategies in accordance with some embodiments disclosed herein.

FIG. 4 illustrates two example procedures for activating mitigation strategies in accordance with embodiments of the systems and methods disclosed herein. Type 1 may occur when the control vehicle 400 does not have any gap detection sensors. Therefore, the control vehicle 400 can rely on its own trajectory when determining stop-and-go waves. After experiencing a stop-and-go wave, control vehicle 400 can determine that control vehicle 400 is experiencing stop-and-go waves. When control vehicle 400 experiences the deceleration phase of the next stop-and-go wave, control vehicle can then activate mitigation strategy 402. For example, the mitigation strategy 402 can maintain a reference speed for the duration of the stop-and-go waves. This consistent speed can set the control vehicle on a consistent trajectory such that the vehicle maintains enough distance from vehicles experiencing stop-and-go waves to avoid experiencing any waves itself.

Type 2 can occur when the control vehicle 404 has gap detection sensors. As described above, the control vehicle 404 can then determine the trajectory of the preceding vehicle 406 by tracking the position of the preceding vehicle 406 through time utilizing gap detection sensor along with the position sensor of vehicle 404. Therefore, the control vehicle 404 can rely on the trajectory of the preceding vehicle 406 when determining stop-and-go waves. After experiencing a stop-and-go wave by vehicle 406, control vehicle 404 can determine that the preceding vehicle 406 is experiencing stop-and-go waves. When control vehicle 404 experiences the deceleration phase of the next stop-and-go wave, control vehicle 404 can then activate mitigation strategy 408. For example, the mitigation strategy 408 can maintain a reference speed for the duration of the stop-and-go wave. This consistent speed can set the control vehicle on a consistent trajectory such that the vehicle maintains enough distance from vehicles experiencing stop-and-go waves to avoid experiencing any waves itself.

As mentioned above, since the trajectory represents preceding vehicle 406, control vehicle 404 does not have to experience a stop-and-go wave at the control vehicle 404, but may extrapolate the movements of preceding vehicle 406 and update operations of control vehicle 404 based on preceding vehicle 406 data. Instead of the control vehicle determining stop-and-go waves after experiencing a wave, the control vehicle can determine that the preceding vehicle is experiencing stop-and-go waves after the preceding vehicle experiences a wave. For example, after preceding vehicle 406 experiences a first stop-and-go wave, control vehicle 404 may determine that stop-and-go waves are occurring and can predict that preceding vehicle 406 will experience a deceleration phase of the next stop-and-go wave.

Based on a threshold distance, control vehicle 404 can activate mitigation strategy 408 when it is at or within a certain distance behind preceding vehicle 406. That distance can equal the sum of reference distance 410 and desired gap 412. Desired minimum gap 412 can be calculated as $$S_{min} = s_0 + v_d \times \tau$$

where $s_0$ can be the minimum gap between vehicles during stopped traffic, $v_d$ can be the reference speed, as described further below, and $\tau$ can represent a desired time gap. The desired time gap and minimum gap may be set by a driver or may comprise a default value associated with traffic trends. Reference distance 410 can be calculated as $$d = v_d \times T_{sg}$$

where $T_{sg}$ is the stop-and-go period threshold as described above.

Figure 5:
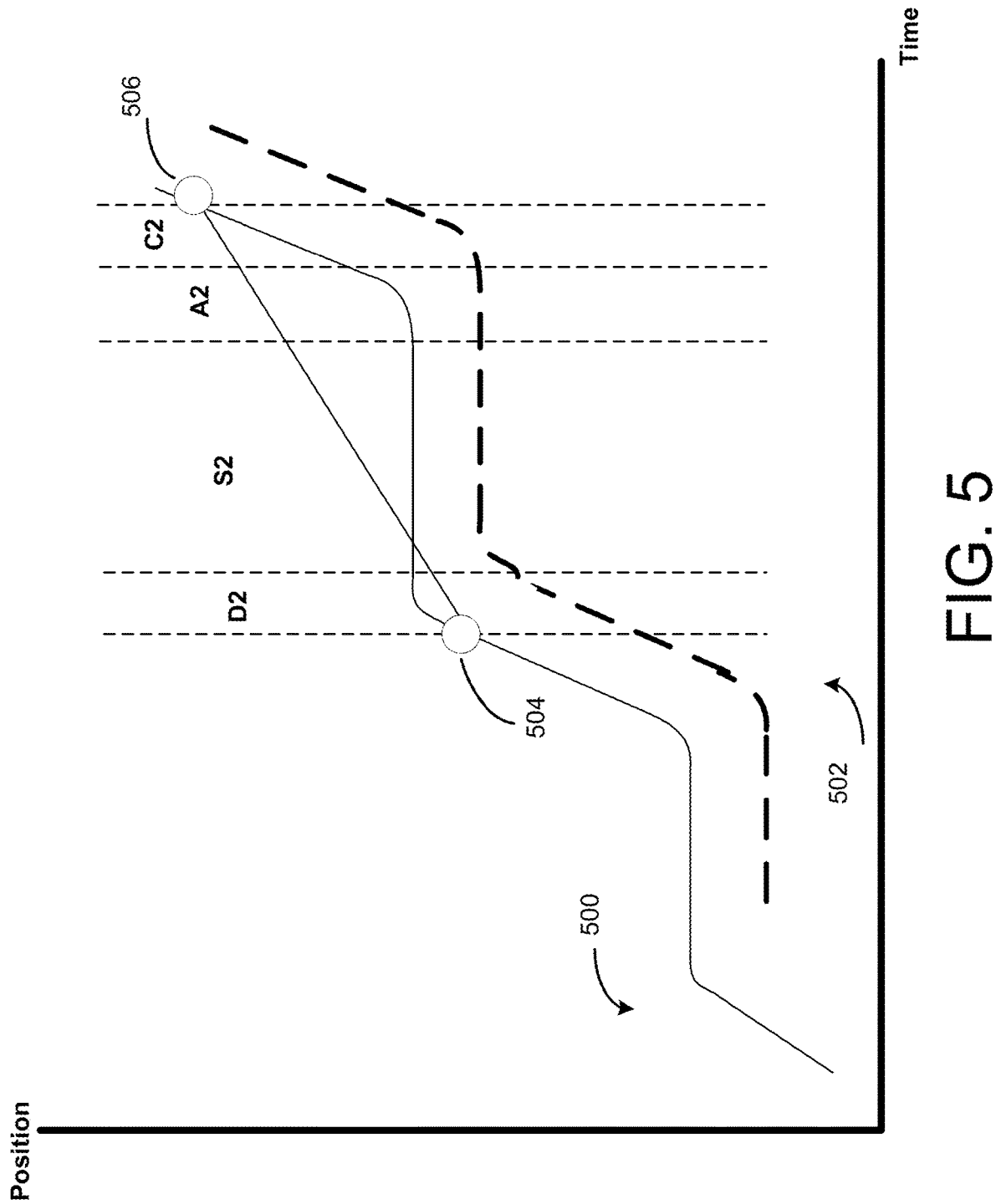
FIG. 5 illustrates an example calculation of a control vehicle's reference speed in accordance with some embodiments disclosed herein.

As referenced above, mitigation strategies may comprise operating the control vehicle at a reference speed to avoid further stop-and-go waves. FIG. 5 illustrates the use of a reference speed in the context of the vehicle's trajectory during a stop-and-go time period. Trajectory 500 illustrates the trajectory of the either the control vehicle or preceding vehicle, depending on whether a Type 1 or Type 2 system is implemented. Trajectory 502 is present to show the trajectory of the control vehicle if line 500 represents the trajectory of the preceding vehicle in a Type 2 case. The reference speed may be illustrated as $$v_d = \frac{\lambda_{sg}}{T_{sg}}$$

where $\lambda_{sg}$ is the distance the vehicle travels in a full stop-and-go wave. $\lambda_{sg}$ and $T_{sg}$ can be updated after each stop-and-go wave or taken as an average across multiple stop-and-go waves. In a case such as Type 1 illustrated in FIG. 4, these values represent the distance and time the control vehicle travels during a stop-and-go wave. For a Type 2 case illustrated in FIG. 4, the values can represent the time and distance preceding vehicle 406 travels during a stop-and-go wave. In other words, the reference speed can be calculated as the slope of the line generated between points 504 and 506. Point 504 represents the moment that line 500 enters the deceleration phase D2. Point 506 represents the moment line 500 leaves the cruising phase C2 to enter a new stop-and-go wave. In a Type 1 case, the line between points 504 and 506 also illustrate the trajectory of the control vehicle once mitigation strategies are activated. Control vehicle 404 can operate at the reference speed until it is determined that there are no further stop-and-go waves.

Mitigation strategies can deactivate after certain conditions. During a Type 1 case, control vehicle 400 can deactivate mitigation strategies after a time threshold or a space threshold. The time threshold can represent a threshold cruising time, after which it can be presumed that control vehicle 400 is no longer experiencing stop-and-go waves. The space threshold can represent a threshold cruising distance, where control vehicle 400 is not in stop-and-go traffic if it cruises for a large enough distance. During a Type 2 case, the time threshold and space thresholds can be associated with preceding vehicle 406 and can be determined based on the distance or time preceding vehicle 406 cruises.

These threshold values can be determined for various scenarios. For example, the threshold values can be determined based on the maximum time or distance traveled during stop-and-go waves during a cruising phase. As an illustration, if the control vehicle travels three hundred feet during a cruising phase in a first stop-and-go wave, and five hundred feet during a second stop-and-go wave, the threshold distance would be five hundred feet. Alternatively, the threshold values can be the average time or distance for a cruising phase (e.g., four hundred feet in the above illustration). These threshold values can be updated after every stop-and-go wave or updated after a set number of stop-and-go waves.

Figure 6:
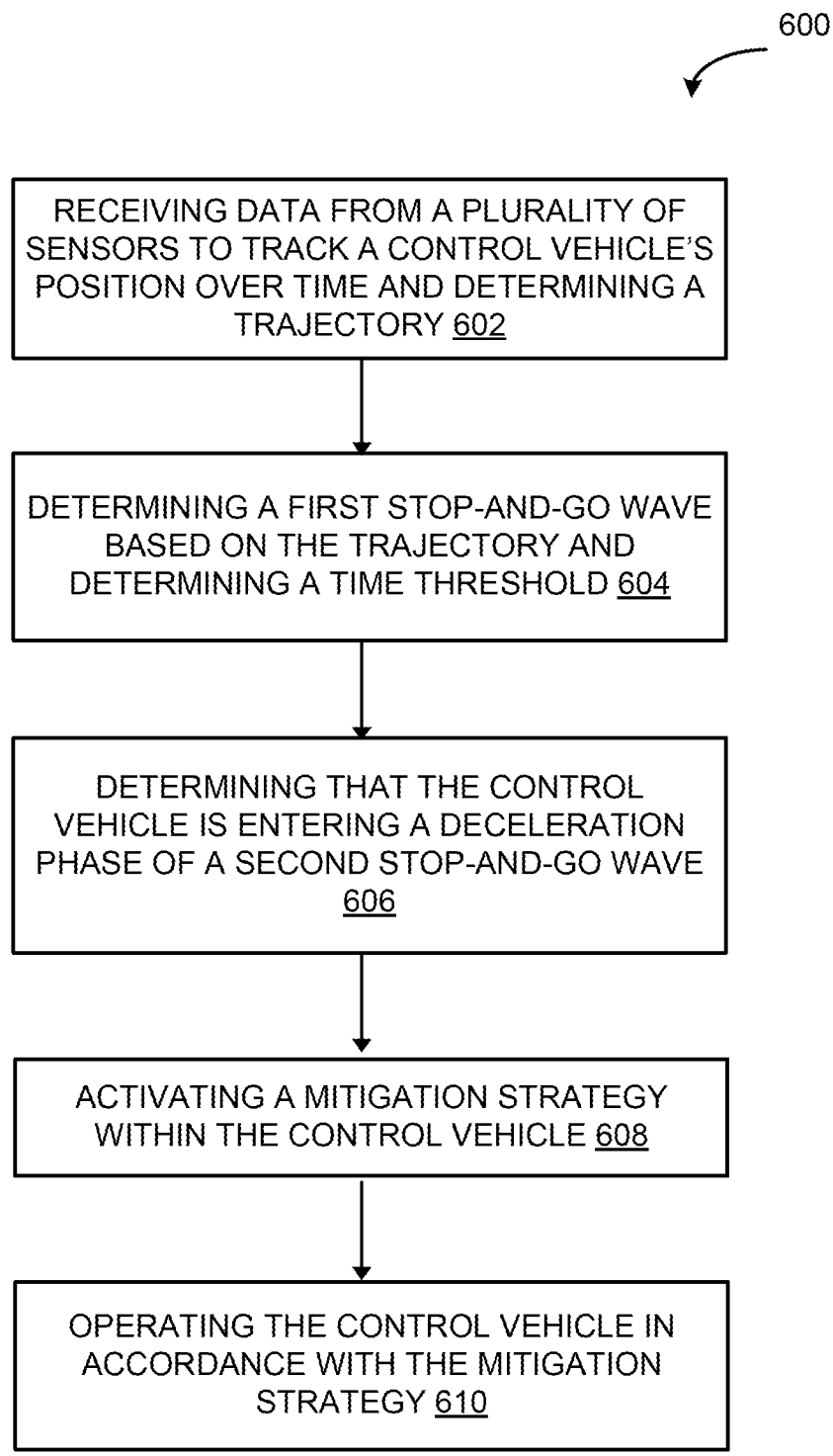
FIG. 6 illustrates an example method for activating mitigation strategies in accordance with some embodiments disclosed herein.

FIG. 6 illustrates an example method for activating mitigation strategies in accordance with some embodiments disclosed herein. Example method 600 may be performed by control vehicle 400 illustrated in Type 1 of FIG. 4 and the corresponding systems of the vehicle illustrated in FIGS. 1 and 2.

At block 602, the system can receive data from a plurality of sensors to track a control vehicle's position over time and determine a trajectory. As described above, in a stop-and-go traffic situation, the vehicle's path or trajectory can resemble a waveform, which in turn can be divided into stop-and-go waves. This trajectory can be measured by one or more sensors, such as GPS or gap detection sensors. The vehicle can track its position over time, which in turn generates a trajectory. The vehicle can then predict the future trajectory based on the tracked position.

At block 604, the system can determine a first stop-and-go wave based on the trajectory and determine a time threshold.

As described above, the wave begins when the control vehicle begins decelerating. The stop-and-go wave can comprise a deceleration phase, a stopped phase, an acceleration phase, and a cruising phase, wherein the wave ends after the vehicle stops cruising and begins decelerating again. Once all four phases are complete, a full stop-and-go wave can be complete. As mentioned above, the time threshold can represent the time it takes for the control vehicle to complete all phases of the stop-and-go wave. In some embodiments, the vehicle can determine that a new wave has begun when the vehicle begins decelerating. In other embodiments, the vehicle can determine that the change in velocity illustrates that the vehicle has concluded the cruising phase, signaling the end of the stop-and-go wave.

At block 606, the system can determine that the control vehicle is entering a deceleration phase of a second stop-and-go wave. As mentioned above, this can be triggered by detecting the change in velocity or detecting the deceleration of the vehicle. This deceleration can represent the beginning of a second stop-and-go wave. In a Type 1 situation, this can signify that the control vehicle has completed a stop-and-go wave and can now implement mitigation strategies based on the recent data.

At block 608, the system can activate a mitigation strategy within the control vehicle. As described above, this mitigation strategy can comprise operating the vehicle at a reference speed. The reference speed can be determined by $$v_d = \frac{\lambda_{sg}}{T_{sg}}$$

where $\lambda_{sg}$ and $T_{sg}$ are the distance and the time the vehicle travels in a full stop-and-go wave. $\lambda_{sg}$ and $T_{sg}$ can be updated after each stop-and-go wave or taken as an average across multiple stop-and-go waves.

At block 610, the system can operate the control vehicle in accordance with the mitigation strategy. As described above, mitigation strategies can deactivate after certain conditions. The control vehicle can deactivate mitigation strategies after a time threshold or a space threshold. The time threshold can represent a threshold cruising time, after which it can be presumed that the control vehicle is no longer experiencing stop-and-go waves. The space threshold can represent a threshold cruising distance, where control vehicle is not in stop-and-go traffic if it cruises for a large enough distance. This threshold may incorporate the full wavelength of the stop-and-go wave. The threshold values can be determined based on the maximum time or distance traveled during stop-and-go waves during a cruising phase. Alternatively, the threshold values can be the average time or distance for a cruising phase. These threshold values can be updated after every stop-and-go wave or updated after a set number of stop-and-go waves.

Figure 7:
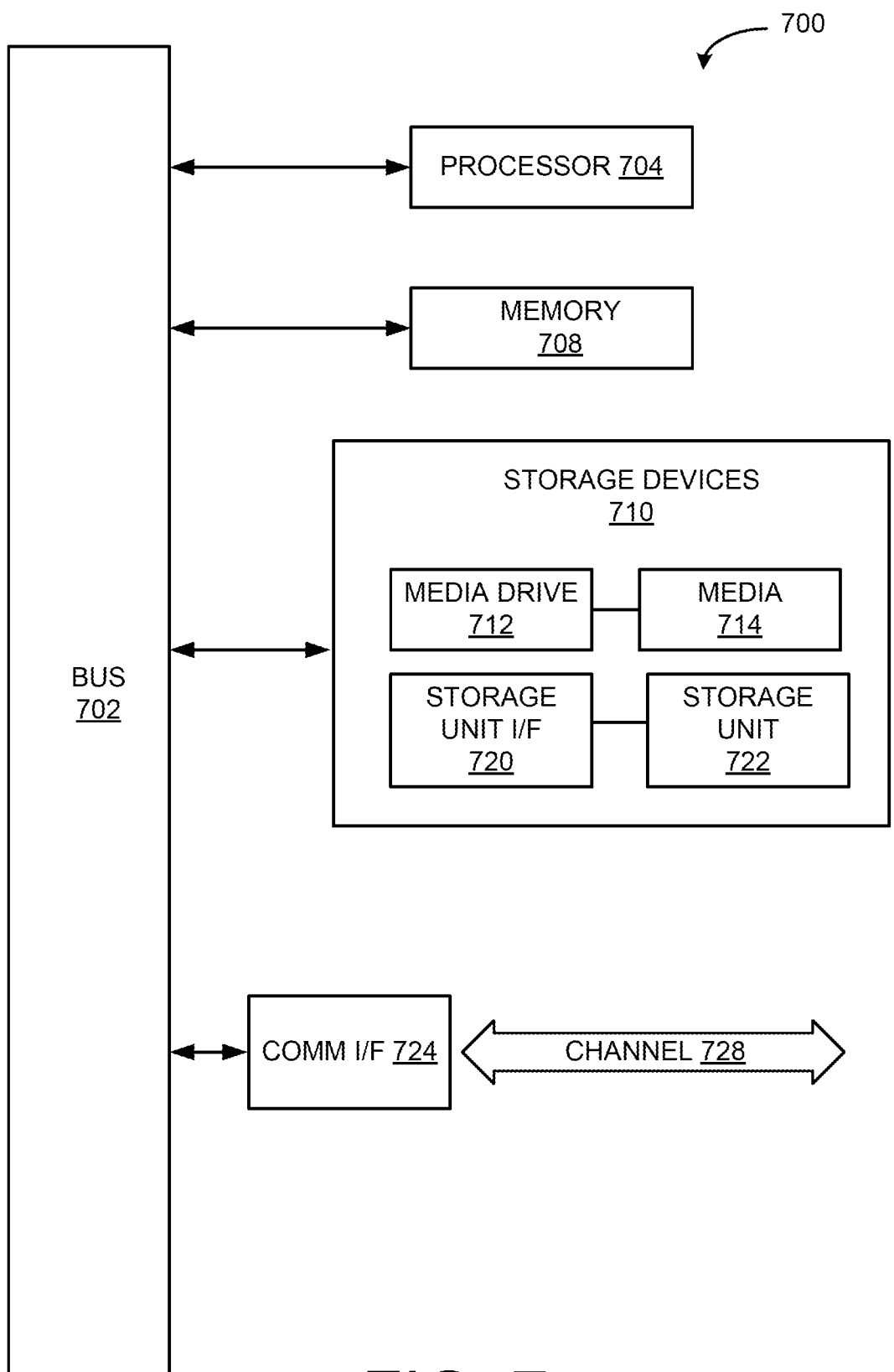
FIG. 7 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 7. Various embodiments are described in terms of this example—computing component 700. After reading this description, it will become apparent to a person skilled in the relevant art how to implement the application using other computing components or architectures.

Referring now to FIG. 7, computing component 700 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, portable computing devices, and other electronic devices that might include some form of processing capability.

Computing component 700 might include, for example, one or more processors, controllers, control components, or other processing devices. Processor 704 might be implemented using a general-purpose or special-purpose processing engine such as, for example, a microprocessor, controller, or other control logic. Processor 704 may be connected to a bus 702. However, any communication medium can be used to facilitate interaction with other components of computing component 700 or to communicate externally.

Computing component 700 might also include one or more memory components, simply referred to herein as main memory 708. For example, random access memory (RAM) or other dynamic memory, might be used for storing information and instructions to be executed by processor 704. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid-state drive, a magnetic tape drive, an optical drive, a compact disc (CD) or digital video disc (DVD) drive (R or RW), or other removable or fixed media drive might be provided. Storage media 714 might include, for example, a hard disk, an integrated circuit assembly, magnetic tape, cartridge, optical disk, a CD or DVD. Storage media 714 may be any other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot. Other examples may include a PCMCIA slot and card, and other fixed or removable storage units 722 and interfaces 720 that allow software and data to be transferred from storage unit 722 to computing component 700.

Computing component 700 might also include a communications interface 724. Communications interface 724 might be used to allow software and data to be transferred between computing component 700 and external devices. Examples of communications interface 724 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 724 may be carried on signals, which can be electronic, electromagnetic (which includes optical) or other signals capable of being exchanged by a given communications interface 724. These signals might be provided to communications interface 724 via a channel 728. Channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
   determining a first stop-and-go wave based on trajectory of a control vehicle and determining a time threshold for the first stop-and-go wave;
   based on the first stop-and-go wave and the time threshold, determining that the control vehicle is entering a deceleration phase of a second stop-and-go wave;
   activating a mitigation strategy within the control vehicle;
   operating the control vehicle in accordance with the mitigation strategy; and
   deactivating the mitigation strategy after a cruise time threshold or a cruise distance threshold has elapsed.

2. The method of claim 1, further comprising determining a reference speed for operating the control vehicle.

3. The method of claim 2, wherein determining a reference speed for operating the control vehicle comprises setting the reference speed at an initial speed and updating the reference speed after a stop-and-go wave.

4. The method of claim 2, wherein the reference speed is based on the first stop-and-go wave and time threshold.

5. The method of claim 1, wherein the cruise time threshold and the cruise distance threshold are determined by:
  determining that the control vehicle is entering a cruise phase; and
  measuring the time at which the control vehicle travels in the cruise phase.

6. The method of claim 5, wherein the cruise time threshold or the cruise distance threshold is based on a maximum cruise time period or a maximum wavelength.

7. A vehicle, comprising:
  at least one gap detection sensor;
  a processor; and
  a memory coupled to the processor to store instructions, which when executed by the processor, cause the processor to:
    determine a first stop-and-go wave based on trajectory of a control vehicle and determine a time threshold for the first stop-and-go wave;
    based on the first stop-and-go wave and time threshold, determine that a preceding vehicle is entering a deceleration phase of a second stop-and-go wave;
    determine a threshold distance between the vehicle and the preceding vehicle at which to activate a mitigation strategy;
    activate the mitigation strategy when a distance between the vehicle and the preceding vehicle is equal to or less than the threshold distance;
    operate the vehicle in accordance with the mitigation strategy; and
    deactivating the mitigation strategy after a cruise time threshold or a cruise distance threshold has elapsed.

8. The vehicle of claim 7, wherein the instructions further cause the processor to determine a reference speed for operating the vehicle.

9. The vehicle of claim 8, wherein the instructions further cause the processor to set the reference speed at an initial speed and update the reference speed after a stop-and-go wave.

10. The vehicle of claim 8, wherein the reference speed is based on the first stop-and-go wave and time threshold.

11. The vehicle of claim 8, wherein the threshold distance is determined by the reference speed, the time threshold, and a minimum desired gap with the preceding vehicle.

12. The vehicle of claim 11, wherein the minimum desired gap is determined by the reference speed, a minimum gap between vehicles during stopped traffic, and a minimum time gap with the preceding vehicle.

13. The vehicle of claim 7, wherein the instructions further cause the processor to:
  determine that the preceding vehicle is entering a cruise phase; and
  measure the time at which the preceding vehicle travels in the cruise phase.

14. The vehicle of claim 13, wherein the cruise time threshold or the cruise distance threshold is based on a maximum cruise time period or a maximum wavelength.

15. A non-transitory machine-readable medium having instructions stored therein, which when executed by a processor, cause the processor to perform operations, the operations comprising:
  receiving data from a plurality of sensors to track a control vehicle's position over time and determining a trajectory;
  determining a first stop-and-go wave based on the trajectory and determining a time threshold for the first stop-and-go wave;
  based on the first stop-and-go wave and time threshold, determining that the control vehicle is entering a deceleration phase of a second stop-and-go wave;
  activating a mitigation strategy within the control vehicle;
  operating the control vehicle in accordance with the mitigation strategy;
  determining that the control vehicle is entering a cruise phase;
  measuring the time at which the control vehicle travels in the cruise phase; and
  deactivating the mitigation strategy after a cruise time threshold or a cruise distance threshold.

16. The non-transitory machine-readable medium of claim 15, wherein the operations further comprise determining a reference speed for operating the control vehicle.

17. The non-transitory machine-readable medium of claim 16, wherein determining a reference speed for operating the control vehicle comprises setting the reference speed at an initial speed and updating the reference speed after a stop-and-go wave.

18. The non-transitory machine-readable medium of claim 16, wherein the reference speed is based on the first stop-and-go wave and time threshold.

19. The non-transitory machine-readable medium of claim 15, wherein the cruise time threshold or the cruise distance threshold is based on a maximum cruise time period or a maximum wavelength.

20. The non-transitory machine-readable medium of claim 15, wherein the first stop-and-go wave comprises a deceleration phase, a stopped vehicle phase, an acceleration phase, and a cruise phase.

* * * * *